United States Patent
Classen et al.

(10) Patent No.: US 8,272,268 B2
(45) Date of Patent: Sep. 25, 2012

(54) TRIAXIAL ACCELERATION SENSOR

(75) Inventors: Johannes Classen, Reutlingen (DE);
Arnd Kaelberer, Schlierbach (DE);
Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 12/543,649

(22) Filed: Aug. 19, 2009

(65) Prior Publication Data
US 2010/0043549 A1 Feb. 25, 2010

(30) Foreign Application Priority Data

Aug. 19, 2008 (DE) .......................... 10 2008 041 327

(51) Int. Cl.
*G01P 15/125* (2006.01)

(52) U.S. Cl. ..................... 73/514.32; 73/514.38; 73/510

(58) Field of Classification Search ............... 73/514.32, 73/514.29, 514.36, 514.38, 510, 511
See application file for complete search history.

(56) References Cited

U.S. PATENT DOCUMENTS

| | | | | |
|---|---|---|---|---|
| 6,230,566 B1 * | 5/2001 | Lee et al. | ................... | 73/514.32 |
| 6,845,670 B1 * | 1/2005 | McNeil et al. | ............. | 73/514.32 |
| 7,140,250 B2 * | 11/2006 | Leonardson et al. | ...... | 73/504.14 |
| 7,210,352 B2 * | 5/2007 | Foster et al. | ............... | 73/514.32 |
| 7,258,012 B2 * | 8/2007 | Xie | ............. | 73/514.32 |
| 7,624,638 B2 * | 12/2009 | Konno et al. | ............. | 73/514.32 |
| 7,637,160 B2 * | 12/2009 | Koury et al. | ............. | 73/514.32 |
| 8,020,443 B2 * | 9/2011 | Lin et al. | ................... | 73/514.32 |

* cited by examiner

*Primary Examiner* — Helen C. Kwok
(74) *Attorney, Agent, or Firm* — Kenyon & Kenyon LLP

(57) ABSTRACT

An acceleration sensor includes a substrate, a rocker mass, a z spring connected to the rocker mass, which allows the rocker mass to rotate about an axis, and at least one additional spring system connected to the substrate and the rocker mass. The additional spring system allows the rocker mass to deflect in an x or y direction oriented parallel or perpendicular to the axis. The z spring or the additional spring system allows the rocker mass to deflect in a y or x direction oriented parallel or perpendicular to the axis.

12 Claims, 4 Drawing Sheets

TRIAXIAL ACCELERATION SENSOR

CROSS-REFERENCE TO RELATED APPLICATIONS

The present application claims priority to Application No. 10 2008 041 327.5, filed in the Federal Republic of Germany on Aug. 19, 2008, which is expressly incorporated herein in its entirety by reference thereto.

FIELD OF THE INVENTION

The present invention relates to an acceleration sensor having a mass situated over a plane of a substrate.

BACKGROUND INFORMATION

Triaxial acceleration sensors, in particular triaxial micromechanical acceleration sensors, are needed for applications in entertainment and automotive electronics. A maximally compact design of the acceleration sensors is considered desirable in those cases.

The basic principle of micromechanical acceleration sensors is that a seismic mass is movably supported with respect to stationary electrodes on a substrate with the aid of a suspension. The seismic mass and the stationary electrodes form one or more capacitors. A deflection of the seismic mass caused by an acceleration acting on the micromechanical acceleration sensor results in a change in the capacitances of these capacitors, which may be detected and represents a measure of the magnitude of the effective acceleration. To avoid zero deviations, capacitance changes are preferably evaluated differentially.

Conventionally, triaxial acceleration sensors are implemented using three sensor cores which are independent of each other and have separate seismic masses, which are situated next to each other on a shared chip. This results in large space requirements and comparatively large acceleration sensors.

SUMMARY

Example embodiments of the present invention provide a triaxial micromechanical acceleration sensor having a compact arrangement.

According to example embodiments of the present invention, an acceleration sensor includes a substrate, a rocker mass, a z spring connected to the rocker mass, which allows the rocker mass to rotate about an axis, and at least one additional spring system connected to the substrate and the rocker mass. The additional spring system allows the rocker mass to deflect in an x or y direction oriented parallel or perpendicular to the axis. The z spring or the additional spring system allows the rocker mass to deflect in a y or x direction oriented parallel or perpendicular to the axis. Since this acceleration sensor needs only one mass element for detecting accelerations in all three spatial directions, the acceleration sensor may have a very compact arrangement.

In example embodiments, the acceleration sensor has grid electrodes, opposite to which substrate electrodes fixedly connected to the substrate are situated, the grid electrodes and substrate electrodes allowing a detection of a deflection of the rocker mass in the x or y direction.

At least one z electrode, fixedly connected to the substrate, may be situated opposite to the rocker mass which allows a detection of a rotation of the rocker mass. At least two z electrodes may be provided, the z electrodes allowing a differential analysis of a rotation of the rocker mass. This makes compensation of zero deviations possible when detecting an acceleration acting perpendicularly to the substrate plane.

The z spring may be arranged as a torsion spring. It is also possible that the additional spring system includes bending springs which are expansible in the x and/or y direction.

In example embodiments of the acceleration sensor, the rocker mass is connected to an internal frame via the z spring, the internal frame being connected to an external frame via two y springs situated on opposite sides of the internal frame and expansible in the y direction, and the external frame is connected to the substrate via two x springs situated on opposite sides of the external frame and expansible in the x direction. The rocker mass has y grid electrodes opposite to which y substrate electrodes, fixedly connected to the substrate, are situated. The y grid electrodes and the y substrate electrodes allow a detection of a deflection of the rocker mass in the y direction. The external frame has x grid electrodes, opposite to which x substrate electrodes fixedly connected to the substrate are situated, the x grid electrodes and the x substrate electrodes allowing a detection of a deflection of the external frame in the x direction. This arrangement allows an extremely compact configuration of the triaxial acceleration sensor to be achieved.

The rocker mass may be connected to a frame via the z spring, the frame being connected to the substrate via a plurality of x-y springs expansible in the x and y directions and situated on the outer edges of the frame. The rocker mass has y grid electrodes opposite to which y substrate electrodes, fixedly connected to the substrate, are situated. The y grid electrodes and the y substrate electrodes allow a detection of a deflection of the rocker mass in the y direction. The frame has x grid electrodes, opposite to which x substrate electrodes, fixedly connected to the substrate, are situated, the x grid electrodes and the x substrate electrodes allowing a detection of a deflection of the frame in the x direction. This arrangement also allows a very compact configuration of the acceleration sensor.

The rocker mass may be connected to a frame via the z spring, the z spring being expansible in the y direction. The frame is connected to the substrate via two x springs situated on opposite sides of the frame and expansible in the x direction. The rocker mass has y grid electrodes, opposite to which y substrate electrodes fixedly connected to the substrate are situated, the y grid electrodes and the y substrate electrodes allowing a detection of a deflection of the rocker mass in the y direction. The frame has x grid electrodes, opposite to which x substrate electrodes, fixedly connected to the substrate, are situated, the x grid electrodes and the x substrate electrodes allowing a detection of a deflection of the frame in the x direction. This also allows a very compact arrangement of the acceleration sensor.

The frame may not fully enclose the rocker mass. This allows the size of the acceleration sensor to be further reduced.

DETAILED DESCRIPTION

Figure 1:
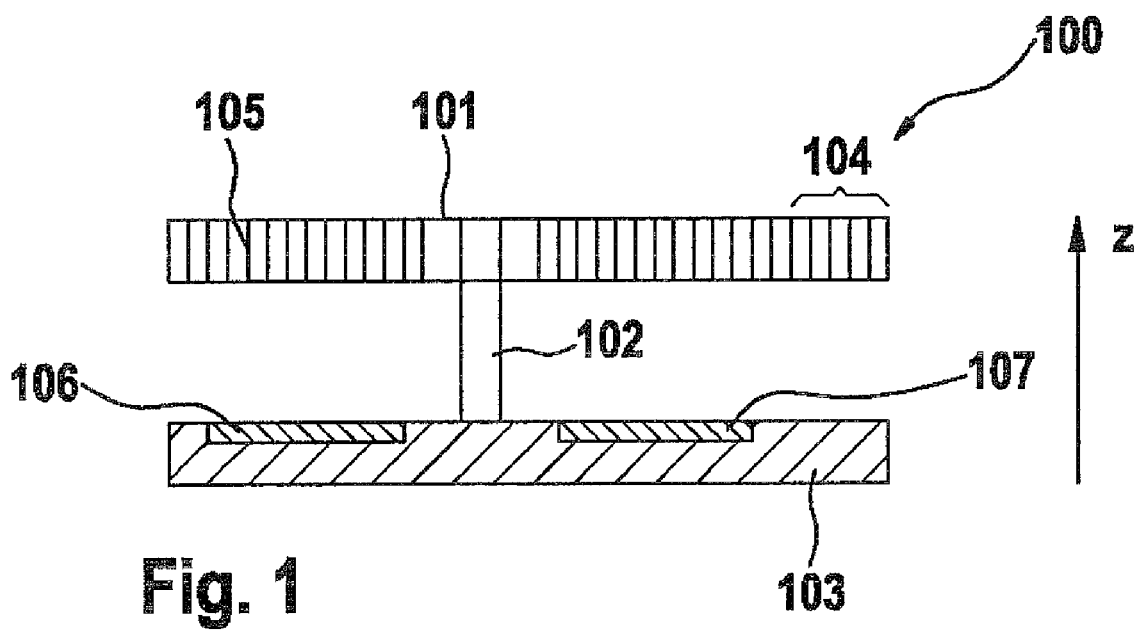
FIG. 1 schematically illustrates the structure of a sensor for detecting accelerations in the z direction.
Figure 2:
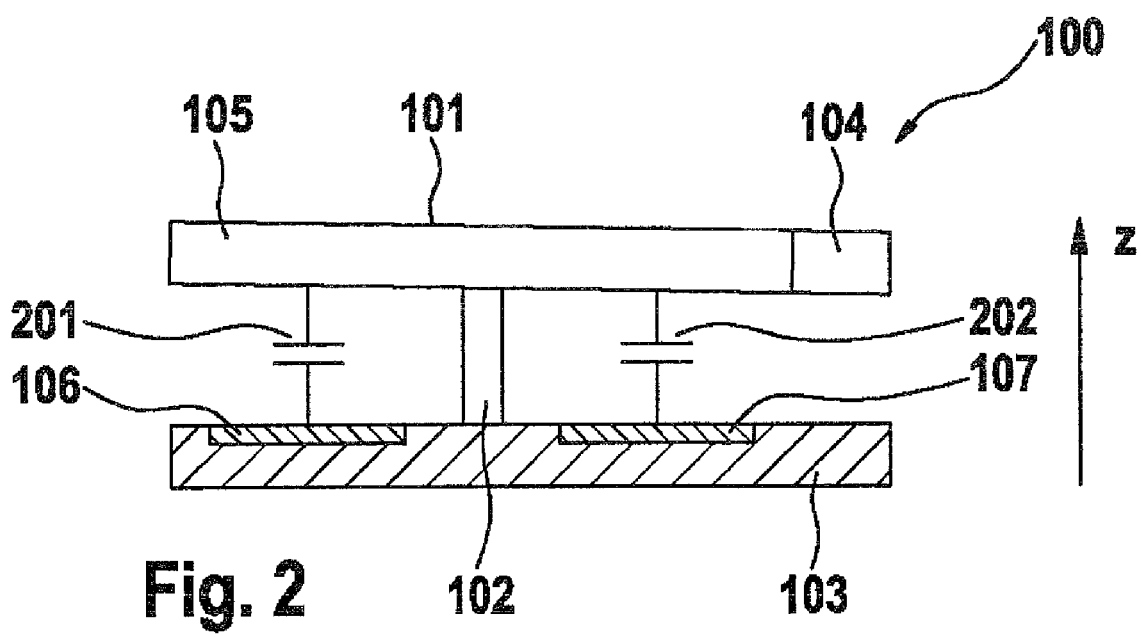
FIG. 2 schematically illustrates the mode of operation of a z acceleration sensor.

FIGS. 1 and 2 schematically illustrate the mode of operation of a sectionally depicted acceleration sensor for detecting an acceleration in a direction perpendicular to a substrate plane. This direction is referred to as the z direction.

As FIG. 1 illustrates, an acceleration sensor 100 includes a seismic mass 101, which is connected to a substrate 103 via a torsion spring 102. Seismic mass 101 is substantially disk-shaped and is situated parallel to the plane of substrate 103. A connection between seismic mass 101 and substrate 103 is established only by torsion spring 102, which is situated in a central area of seismic mass 101.

Substrate 103 has a first substrate electrode 106 fixedly connected to substrate 103 and a second substrate electrode 107 fixedly connected to substrate 103. First substrate electrode 106 and second substrate electrode 107 are situated underneath seismic mass 101 on different sides next to torsion spring 102.

On one side of torsion spring 102, seismic mass 101 has an additional mass 104 compared to the other side of torsion spring 102. This mass asymmetry of seismic mass 101 regarding its suspension point causes seismic mass 101 to tilt about torsion spring 102 if an acceleration acts on acceleration sensor 100 in the z direction.

As FIG. 2 illustrates, seismic mass 101 represents a rocker electrode 105, which, together with first substrate electrode 106, forms a first capacitor 201 and, together with second substrate electrode 107, forms a second capacitor 202. The capacitances of first capacitor 201 and second capacitor 202 are substantially determined by the distance between rocker electrode 105 and first substrate electrode 106 and second substrate electrode 107. A tilt of seismic mass 101 about torsion spring 102 caused by an acceleration acting in the z direction changes these distances and thus the capacitances of first capacitor 201 and second capacitor 202. If the part of rocker electrode 105 forming first capacitor 201 moves away from substrate 103, the part of seismic mass 101 forming second capacitor 202 moves closer to substrate 103. In this instance, the capacitance of first capacitor 201 is reduced, while the capacitance of second capacitor 202 is increased. The capacitances and capacitance changes may be detected and analyzed via evaluation electronics connected to first capacitor 201 and second capacitor 202. The capacitance changes of first capacitor 201 and second capacitor 202 in opposite directions allow a differential analysis, which provides a linearized relationship between the acceleration acting on acceleration sensor 100 and the output signal. The differential analysis allows a compensation of zero point errors.

Figure 3:
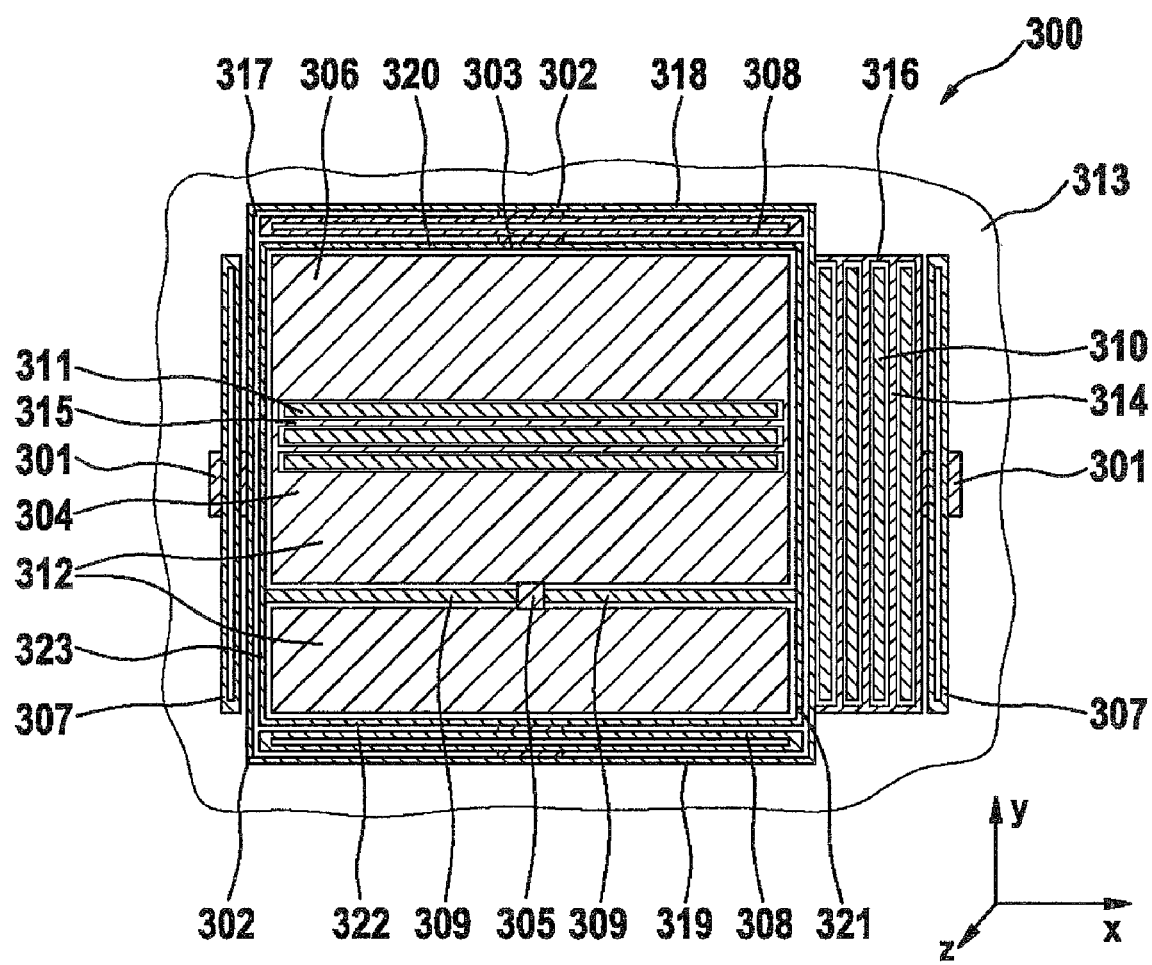
FIG. 3 schematically illustrates an example embodiment of a triaxial acceleration sensor.

FIG. 3 illustrates an example embodiment of a triaxial acceleration sensor 300. Acceleration sensor 300, illustrated in a top view, is situated in a z direction above a substrate 313, situated in an x-y plane.

Acceleration sensor 300 is connected to substrate 313 via two fixing points 301. Fixing points 301 are situated on two opposite sides of acceleration sensor 300 in the x direction. Each fixing point 301 is connected to an x spring 307, which is expansible in the x direction and rigid in the y and z directions x springs 307 may be arranged, for example, as bar springs made of four bars situated along the edges of a rectangle and connected in the end areas. The longitudinal direction of x springs 307 is oriented in the y direction. The two longitudinal sides of x springs 307 may be elastically moved toward and away from each other. The longitudinal bar of each x spring 307, external to acceleration sensor 300, is connected to one of fixing points 301. The internal bar of each of the two x springs 307 is connected to an external frame 302. In example embodiments, x springs 307 may also have an S-shaped configuration, for example.

External frame 302 encloses a surface which is subdivided into two sections. A first, substantially rectangular section 316, whose longitudinal side is oriented in the y direction, is provided along a right-hand edge of frame 302, oriented in the y direction. In this section, frame 302 forms bar-shaped x grid electrodes 314 oriented in the y direction. Strip-shaped x substrate electrodes 310, oriented in the y direction and fixedly connected to substrate 313, are situated between bar-shaped x grid electrodes 314. x substrate electrodes 310, together with x grid electrodes 314, form a capacitor, whose capacitance is a function of the distance between grid electrodes 314 and x substrate electrodes 310.

Second surface section 317, enclosed by external frame 302, is substantially rectangular and is situated next to rectangular first section 316. Two bars 318, 319, oriented parallel to the x direction of rectangular section 317 of external frame 302, are each connected to a y spring 308. y springs 308 have the same shape as x springs 307; however, they are rotated with respect thereto by 90°, so that a longitudinal direction of y springs 308 is oriented parallel to the x direction. A longitudinal bar of each of the two y springs 308 is connected to external frame 302. The other longitudinal bar of each of the two y springs 308 is connected to an internal frame 303. In example embodiments, y springs 308 may have an S-shaped arrangement, for example.

Internal frame 303 has four bars 320, 321, 322, 323 situated along the edges of a substantially square-shaped rectangle. The internal surface of internal frame 303 is subdivided into two sections of different sizes by two z springs 309, having a web 305 therebetween and extending between bars 321, 323, oriented parallel to the y direction, of internal frame 303. The two z springs 309 are arranged as bar-shaped torsion springs, which extend in the x direction on either side of web 305.

Web 305 is connected to a rocker mass 304, which substantially fills the two sections of different sizes of the surface enclosed by internal frame 303. Rocker mass 304 is rotatable about the axis formed by the two z springs 309 and oriented in the x direction. The parts of rocker mass 304 situated on either side of the axis of rotation have different sizes. The larger part of rocker mass 304 includes, compared to the smaller part of rocker mass 304, an additional mass 306. A z electrode 312, fixedly connected to substrate 313, is situated in the z direction underneath both parts of rocker mass 304. The two z electrodes 312 occupy approximately the same surface. The two z electrodes 312, together with rocker mass 304, form a capacitor, whose capacitance is a function of the distance between rocker mass 304 and the particular z electrode 312.

Bar-shaped y grid electrodes 315, oriented in the x direction, are integrated into the larger part of rocker mass 304, enclosing additional mass 306. Strip-shaped y substrate electrodes 311, oriented in the x direction and fixedly connected to substrate 313, are situated between bar-shaped y grid electrodes 315. Together with y grid electrodes 315 of rocker mass 304, y substrate electrodes 311 form capacitors, whose capacitance is a function of the distance between y grid electrodes 315 and y substrate electrodes 311.

An acceleration acting on acceleration sensor 300 in the x direction results in a force acting on rocker mass 304 in the x direction, elastically deforming x springs 307 and deflecting external frame 302 in the x direction. The greater the acceleration acting on acceleration sensor 300, the greater the deflection. The deflection of external frame 302 results in a change in the distance between x substrate electrodes 310 and x grid electrodes 314 of external frame 302, whereby the capacitance of the capacitor formed by x substrate electrodes 310 and x grid electrodes 314 also changes. This capacitance change may be detected and analyzed with the aid of evaluation electronics connected to acceleration sensor 300.

An acceleration acting on acceleration sensor 300 in the y direction results in a force acting on rocker mass 304 in the y direction, elastically deforming the two y springs 308 and deflecting internal frame 303 in the y direction. The higher the acceleration acting on acceleration sensor 300, the greater the deflection of internal frame 303. The deflection of internal frame 303 in the y direction causes a change in the distance between y grid electrodes 315 integrated into rocker mass 304 and y substrate electrodes 311 fixedly connected to substrate 313. This changes the capacitance of the capacitor formed by y grid electrodes 315 and y substrate electrodes 311, which may be detected and quantified with the aid of evaluation electronics connected to acceleration sensor 300.

An acceleration acting on acceleration sensor 300 in the z direction results in a force acting on rocker mass 304 in the z direction. Since the parts of rocker mass 304 situated on either side of z springs 309 have different masses, a greater force acts on the part of rocker mass 304 provided with additional mass 306 than on the other part of rocker mass 304. This force imbalance causes a torque acting on rocker mass 304 relative to z springs 309, causing rocker mass 304 to tilt about the axis formed by z springs 309. The greater the acceleration acting on acceleration sensor 300, the greater the tilt of rocker mass 304. Due to the tilt of rocker mass 304, the capacitances of both capacitors formed by rocker mass 304 and the two z electrodes 312 fixedly connected to substrate 313 change. The capacitance of one capacitor increases, while that of the other one decreases. These capacitance changes may be detected and analyzed by evaluation electronics connected to acceleration sensor 300. Since two capacitors are available whose capacitance changes have opposite signs, a differential analysis of the capacitance changes is possible. This increases the accuracy.

Figure 4:
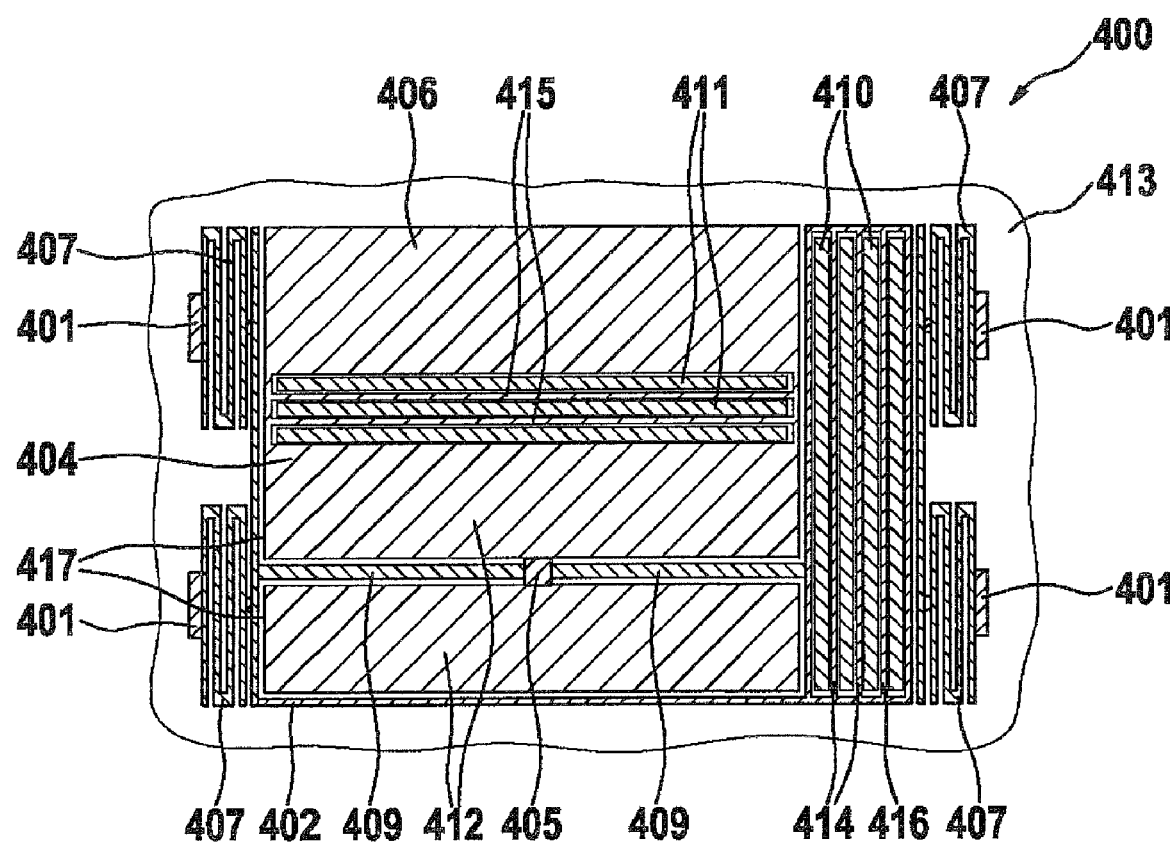
FIG. 4 schematically illustrates an example embodiment of a triaxial acceleration sensor.

FIG. 4 illustrates and example embodiment of an acceleration sensor 400. Acceleration sensor 400 is situated in the z direction above a substrate 413, situated in an x-y plane.

Acceleration sensor 400 includes four x-y springs 407, each of which is connected to substrate 413 via a fixing point 401. Each x-y spring 407 is designed as a meander-shaped bar structure. One end of each meander-shaped x-y spring 407 is connected to one of fixing points 401. The other end of each x-y spring 407 is connected to a frame 402 of acceleration sensor 400. Two x-y springs 407 are situated on each of two lateral edges of frame 402, opposite to each other and extending in the y direction. Each x-y spring 407 is elastically deformable in the x and y directions, but rigid in the z direction. In embodiments, x-y springs 407 may also have an S-shaped arrangement, for example.

Frame 402 is partially open on one side and has a substantially rectangular basic shape, which is formed by the bar sections of frame 402, extending along the lateral edges of the rectangle. The surface surrounded by frame 402 is subdivided into two sections 416, 417. Along one of the lateral edges of frame 402, running in the y direction, a rectangular section 416 is provided, whose longitudinal side is oriented in the y direction. In this section 416, frame 402 forms bar-shaped x grid electrodes 414 oriented in the y direction. Strip-shaped x substrate electrodes 410, oriented in the y direction and fixedly connected to substrate 413, are situated between bar-shaped x grid electrodes 414. x substrate electrodes 410, together with x grid electrodes 414, form a capacitor, whose capacitance is a function of the distance between x grid electrodes 414 and x substrate electrodes 410.

Second section 417 of the surface surrounded by frame 402 is substantially filled by the two wings of different sizes of a rocker mass 404. The two wings of rocker mass 404 are connected via a web 405. Web 405 is connected to frame 402 on each side via a z spring 409 extending in the x direction. The two z springs 409 are designed as bar-shaped torsion springs and allow rocker mass 404 to tilt about the axis of rotation formed by z springs 409.

The greater of the two wings of rocker mass 404 includes an additional mass 406 compared to the smaller wing of rocker mass 404. Bar-shaped y grid electrodes 415, oriented in the x direction, are integrated into the larger wing of rocker mass 404. Strip-shaped y substrate electrodes 411, oriented in the x direction and fixedly connected to substrate 413, are situated between bar-shaped y grid electrodes 415. y substrate electrodes 411, together with y grid electrodes 415, form a capacitor, whose capacitance is a function of the distance between y grid electrodes 415 and y substrate electrodes 411.

A z electrode 412, fixedly connected to substrate 413, is situated underneath each of the two wings of rocker mass 404. Both z electrodes 412 occupy approximately the same surface. Each of the two z electrodes 412, together with rocker mass 404, forms a capacitor, whose capacitance is a function of the distance between rocker mass 404 and the particular z electrode 412.

The bar sections of frame 402 enclosing rocker mass 404 may be optionally omitted to reduce the space required by acceleration sensor 400. For example, in the illustration of FIG. 4, the bar section of frame 402, enclosing the larger wing of rocker mass 404, has been omitted.

An acceleration acting on acceleration sensor 400 in the x direction generates a force acting on rocker mass 404 in the x direction. This elastically deforms x-y springs 407 in the x direction and deflects frame 402 in the x direction. The greater the acceleration acting on acceleration sensor 400, the greater the deflection of frame 402. The deflection of frame 402 causes a change in the distance between x grid electrodes 414 and y substrate electrodes 410 connected to substrate 413. This changes the capacitance of the capacitor formed by x substrate electrodes 410 and x grid electrodes 414, which may be detected and analyzed with the aid of evaluation electronics connected to acceleration sensor 400.

An acceleration acting on acceleration sensor 400 in the y direction results in a force acting on rocker mass 404 in the y direction, elastically deforming x-y springs 407 and deflecting frame 402 in the y direction. The greater the acceleration acting on acceleration sensor 400, the greater the deflection of frame 402 in the y direction. The deflection of frame 402 causes a change in the capacitance of the capacitor formed by y grid electrodes 415 and y substrate electrodes 411 connected to substrate 413. This capacitance change may be detected and analyzed by an evaluation electronics connected to acceleration sensor 400.

An acceleration acting on acceleration sensor 400 in the z direction results in a force acting on rocker mass 404 in the z direction. Due to the different masses of the two wings of rocker mass 404, the forces acting on the two wings of the rocker mass are different and result in a torque acting on rocker mass 404, causing rocker mass 404 to tilt about the axis formed by z springs 409. This changes the distances between rocker mass 404 and the two z electrodes 412 connected to substrate 413. As a result, the capacitance of a capacitor formed by one of z electrodes 412 and rocker mass 404 increases, while the capacitance of the capacitor formed by the other z electrode 412 and rocker mass 404 decreases. These capacitance changes may be detected and differentially analyzed by evaluation electronics connected to acceleration sensor 400.

Figure 5:
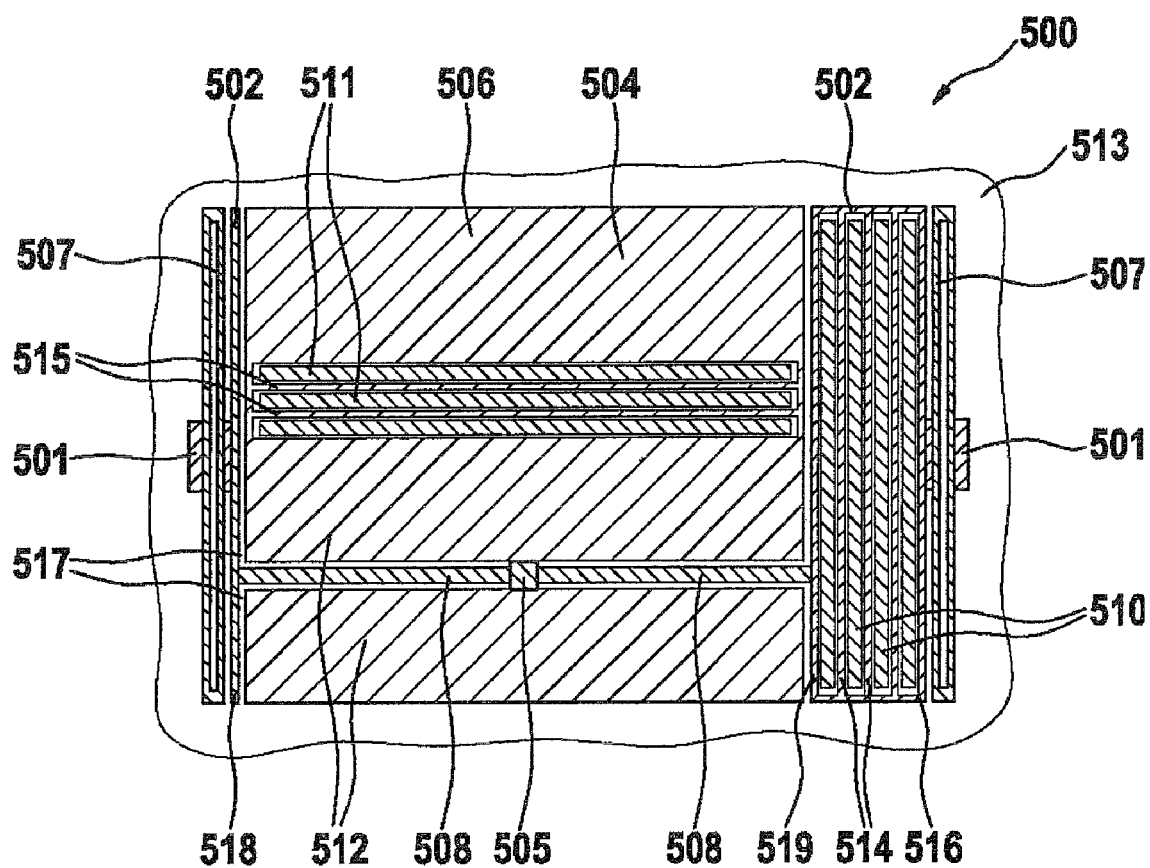
FIG. 5 schematically illustrates an example embodiment of a triaxial acceleration sensor.

FIG. 5 shows an example embodiment of an acceleration sensor 500. Substantially disk-shaped acceleration sensor 500 is situated, in a z direction, above a substrate 513 provided in an x-y plane.

Acceleration sensor 500 includes two x springs 507, which are situated on opposite sides of acceleration sensor 500 in the x direction. x springs 507 have four bar sections extending along the edges of a rectangle and are connected in the end areas. x springs 507 are oriented parallel to the y axis in the longitudinal direction. Each of x springs 507 is elastically deformable in the x direction, but rigid in the y and z directions. On the external bar section of the two bar sections extending in the y direction, each of x springs 507 is connected to substrate 513 via a fixing point 501. The internal bar section of each of the two x springs 507 is connected to a frame 502. In example embodiments, x springs 507 may have an S-shaped arrangement, for example.

Frame 502 partially encloses a rectangular base shape which is subdivided into two sections 516, 517.

First section 516 is formed by bar-shaped x grid electrodes 514, which are situated along a shorter lateral edge of frame 502, oriented in the y direction. Strip-shaped x substrate electrodes 510, oriented in the y direction and fixedly connected to substrate 513, are situated between x grid electrodes 514 oriented in the y direction. On the side of first section 516 facing second section 517, the first section is delimited by a bar 519 of frame 502, oriented in the y direction.

Second section 517 of the surface surrounded by frame 502 extends between bar 519 and another bar 518 of frame 502, oriented in the y direction, and is substantially filled by two wings of different sizes of a rocker mass 504. The two wings of rocker mass 504 are connected via a web 505. Web 505 is connected on both sides to bars 518 and 519 of frame 502 via two y-z springs 508 oriented in the x direction. y-z springs are arranged as bar-shaped torsion springs. y-z springs 508 allow rocker mass 504 to tilt about an axis formed by y-z springs 508 oriented in the x direction. In addition, y-z springs 508 allow rocker mass 504 to deflect in the y direction. y-z springs 508 are rigid in the x direction.

Since the two wings of rocker mass 504 are of different sizes, the larger of the two wings of rocker mass 504 has an additional mass 506 compared to the smaller of the two wings of rocker mass 504. Bar-shaped y grid electrodes 515, oriented in the x direction, are integrated into the larger of the two wings of rocker mass 504. Strip-shaped y substrate electrodes 511, oriented in the x direction and fixedly connected to substrate 513, are situated between bar-shaped y grid electrodes 515.

A z electrode 512, fixedly connected to substrate 513, is situated in the z direction underneath each of the two wings of rocker mass 504. The two z electrodes 512 occupy approximately the same surface. Each of the two z electrodes 512, together with one of the wings of rocker mass 504, form a capacitor, whose capacitance is a function of the distance between rocker mass 504 and the particular z electrode 512.

The bar sections of frame 502 enclosing rocker mass 504 may be omitted to reduce the space requirement of acceleration sensor 500. In the illustration of FIG. 5, for example, the two bar areas of frame 502, parallel to the x axis and enclosing rocker mass 504, have been omitted. In example embodiments, the end areas of bars 518, 519 of frame 502 might be connected to each other.

If an acceleration acts on acceleration sensor 500 in the x direction, a force acts on rocker mass 504 in the x direction, elastically deforming both x springs 507 and deflecting frame 502 in the x direction. This changes the capacitance of the capacitor formed by x grid electrodes 514 and x substrate electrode 510. This capacitance change may be detected and analyzed with the aid of evaluation electronics connected to acceleration sensor 500.

If an acceleration acts on acceleration sensor 500 in the y direction, a force acts on rocker mass 504 in the y direction, elastically deforming y-z springs 508 in the y direction and deflecting rocker mass 504 in the y direction. This deflection of rocker mass 504 changes the capacitance of the capacitor formed by y grid electrodes 515 and y substrate electrode 511. This capacitance change may be detected and quantified with the aid of evaluation electronics connected to acceleration sensor 500.

An acceleration acting on acceleration sensor 500 in the z direction results in a force acting on rocker mass 504 in the z direction. Due to the different masses of the two wings of rocker mass 504, the forces acting on the two wings of rocker mass 504 are different and generate a torque acting on rocker mass 504, causing rocker mass 504 to tilt about the axis formed by y-z springs 508. The greater the acceleration acting on acceleration sensor 500, the greater the tilt. Due to the tilt of rocker mass 504, the capacitances of the two capacitors formed by the wings of rocker mass 504 and the two z electrodes 512 situated underneath the wings in the z direction change. The capacitance of one capacitor increases, that of the other capacitor decreases. This capacitance change may be detected and differentially analyzed with the aid of evaluation electronics connected to acceleration sensor 500.

Acceleration sensors 400 and 500 illustrated in FIGS. 4 and 5 differ from acceleration sensor 300 shown in FIG. 3 by a reduced space requirement. The common feature of all acceleration sensors 300, 400, 500 compared to conventional arrangements is a reduced space requirement, which is achieved by the use, by all of them, of the rocker mass for detecting accelerations in all three spatial directions.

In all acceleration sensors 300, 400, 500, x substrate electrodes 310, 410, 510 and y substrate electrodes 311, 411, 511 may also be arranged for differential analysis of a deflection in the x and/or y direction. Implementation options are known to those skilled in the art from conventional arrangements.

What is claimed is:

1. An acceleration sensor, comprising:
   a substrate;
   a rocker mass;
   at least two z springs connected to the rocker mass and arranged to allow the rocker mass to rotate about an axis; and
   at least one additional spring system connected to the substrate and the rocker mass;
   wherein the additional spring system is configured to allow the rocker mass to deflect in at least one of (a) an x and (b) a y direction oriented one of (a) parallel and (b) perpendicular to the axis, at least one of (a) the at least two z springs and (b) the additional spring system configured to allow the rocker mass to deflect in at least one of (a) a y and (b) an x direction oriented one of (a) parallel and (b) perpendicular to the axis,
   wherein the rocker mass is connected to a frame having an internal surface that is subdivided into two sections of different sizes by the at least two springs.

2. The acceleration sensor according to claim 1, wherein further comprising grid electrodes arranged opposite to substrate electrodes fixedly connected to the substrate, the grid electrodes and the substrate electrodes configured to allow a detection of a deflection of the rocker mass in at least one of (a) the x and (b) the y direction.

3. The acceleration sensor according to claim 1, further comprising at least one z electrode fixedly connected to the substrate arranged opposite to the rocker mass, the z electrode configured to allow a detection of a rotation of the rocker mass.

4. The acceleration sensor according to claim 3, wherein at least two z electrodes are provided, the z electrodes configured to allow a differential analysis of a rotation of the rocker mass.

5. The acceleration sensor according to claim 1, wherein the z spring is arranged as a torsion spring.

6. The acceleration sensor according to claim 1, wherein the additional spring system includes bending springs expansible in at least one of (a) the x and (b) the y direction.

7. The acceleration sensor according to claim 1, wherein the rocker mass is connected to an internal frame via the z spring, the internal frame connected to an external frame via two y springs, arranged on opposite sides of the internal frame and expansible in the y direction, the external frame connected to the substrate via two x springs, arranged on opposite sides of the external frame and expansible in the x direction, the rocker mass having y grid electrodes opposite to y substrate electrodes, fixedly connected to the substrate, the y grid electrodes and the y substrate electrodes configured to allow a detection of a deflection of the rocker mass in the y direction, the external frame having x grid electrodes opposite to x substrate electrodes, fixedly connected to the substrate, the x grid electrodes and the x substrate electrodes adapted to allow a detection of a deflection of the external frame in the x direction.

8. The acceleration sensor according to claim 1, wherein the rocker mass is connected to a frame via the z spring, the frame connected to the substrate via a plurality of x-y springs expansible in the x and y directions and situated on outer edges of the frame, the rocker mass having y grid electrodes, opposite to y substrate electrodes, fixedly connected to the substrate, the y grid electrodes and the y substrate electrodes configured to allow a detection of a deflection of the rocker mass in the y direction, the frame having x grid electrodes, opposite to x substrate electrodes fixedly connected to the substrate, the x grid electrodes and the x substrate electrodes configured to allow a detection of a deflection of the frame in the x direction.

9. The acceleration sensor according to claim 1, wherein the rocker mass is connected to a frame via the z spring, the z spring expansible in the y direction, the frame connected to the substrate via two x springs expansible in the x direction and situated on opposite sides of the frame, the rocker mass having y grid electrodes, opposite to y substrate electrodes fixedly connected to the substrate, the y grid electrodes and the y substrate electrodes configured to allow a detection of a deflection of the rocker mass in the y direction, the frame having x grid electrodes, opposite to x substrate electrodes fixedly connected to the substrate, the x grid electrodes and the x substrate electrodes configured to allow a detection of a deflection of the frame in the x direction.

10. The acceleration sensor according to claim 8, wherein the frame does not completely enclose the rocker mass.

11. The acceleration sensor according to claim 9, wherein the frame does not completely enclose the rocker mass.

12. The acceleration sensor according to claim 1, wherein the at least two springs are connected via a web and extend between two parallel bars of the frame.

* * * * *